United States Patent
Ladkat et al.

(10) Patent No.: US 11,853,391 B1
(45) Date of Patent: Dec. 26, 2023

(54) DISTRIBUTED MODEL TRAINING

(71) Applicant: Amazon Technologies, Inc., Seattle, WA (US)

(72) Inventors: Pranav Prashant Ladkat, Seattle, WA (US); Oleg Rybakov, Seattle, WA (US); Nikko Strom, Kirkland, WA (US); Sri Venkata Surya Siva Rama Krishna Garimella, Bangalore (IN); Sree Hari Krishnan Parthasarathi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 857 days.

(21) Appl. No.: 16/139,607

(22) Filed: Sep. 24, 2018

(51) Int. Cl.
*G06F 18/214* (2023.01)
*G06N 20/00* (2019.01)

(52) U.S. Cl.
CPC ......... *G06F 18/2148* (2023.01); *G06N 20/00* (2019.01)

(58) Field of Classification Search
CPC .............................. G06N 20/00; G06K 9/6257
See application file for complete search history.

(56) References Cited

U.S. PATENT DOCUMENTS

| | | | | |
|---|---|---|---|---|
| 2016/0300252 | A1* | 10/2016 | Frank | G06F 21/6245 |
| 2017/0228645 | A1* | 8/2017 | Wang | G06N 3/045 |
| 2018/0129969 | A1* | 5/2018 | Feng | G06N 20/20 |
| 2019/0050743 | A1* | 2/2019 | Chen | G06F 18/214 |
| 2019/0114537 | A1* | 4/2019 | Wesolowski | G06N 3/084 |
| 2019/0188560 | A1* | 6/2019 | Le | G06N 3/045 |

* cited by examiner

*Primary Examiner* — Peet Dhillon
(74) *Attorney, Agent, or Firm* — PIERCE ATWOOD LLP

(57) ABSTRACT

Exemplary embodiments provide distributed parallel training of a machine learning model. Multiple processors may be used to train a machine learning model to reduce training time. To synchronize trained model data between the processors, data is communicated between the processors after some number of training cycles. To improve the communication efficiency, exemplary embodiments synchronize data among a set of processors after a predetermined number of training cycles, and synchronize data between one or more processors of each set of the processors after a predetermined number of training cycles. During the first synchronization among a set of processors, compressed model gradient data generated after performing the training cycles may be communicated. During the second synchronization between the set of processors, trained models or full model gradient data generated after performing the training cycles may be communicated.

18 Claims, 9 Drawing Sheets

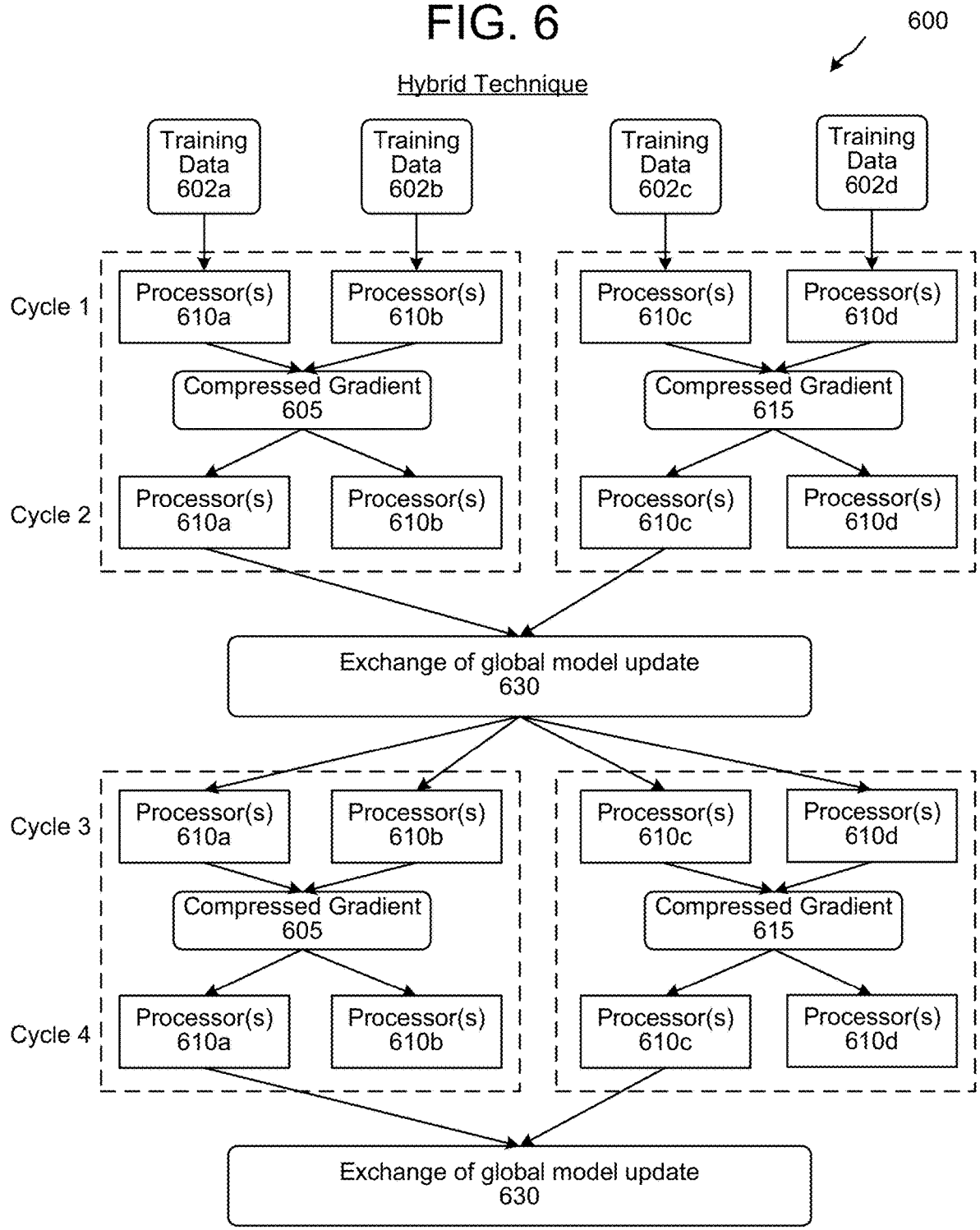

Cross validation accuracy as function of num epochs and time

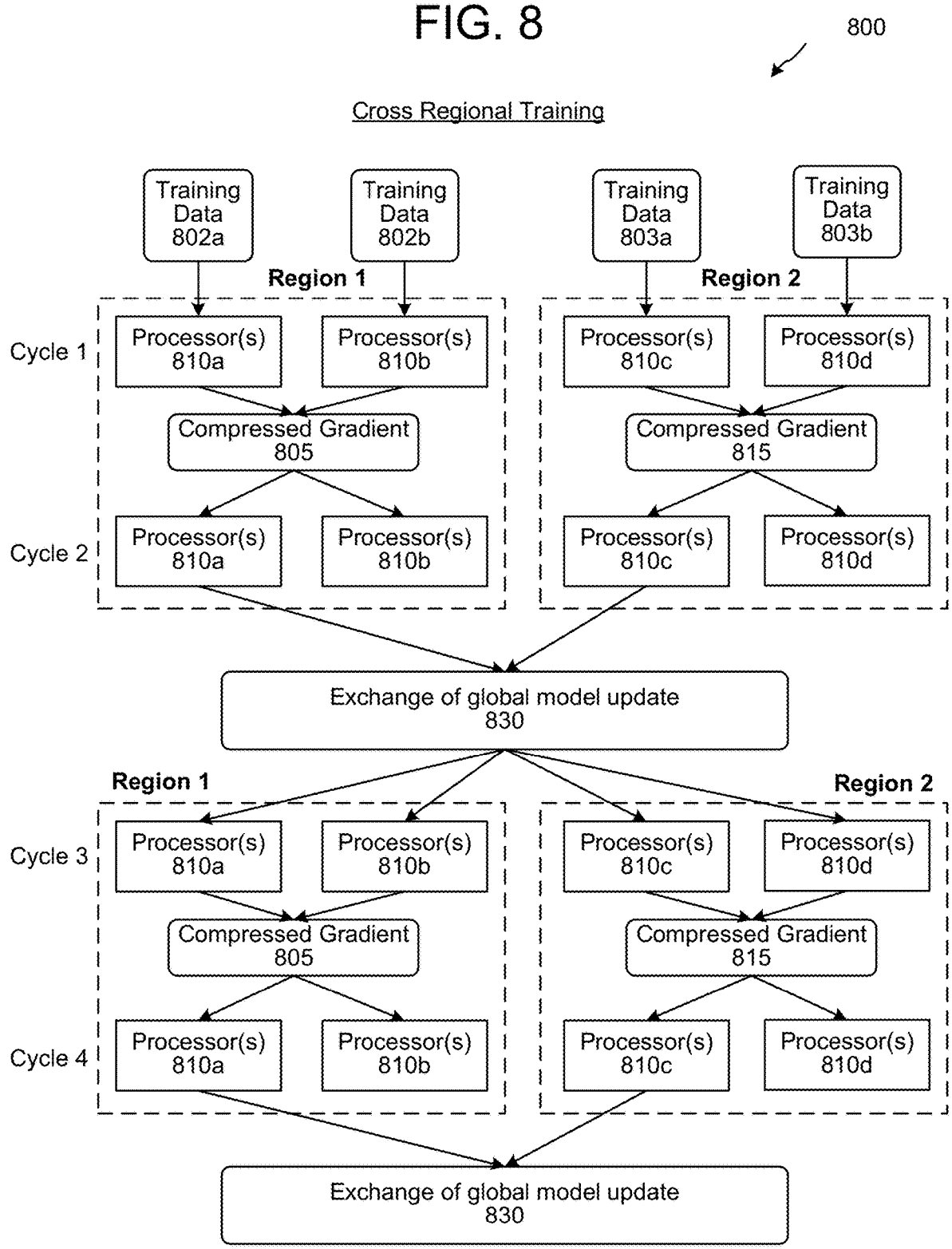

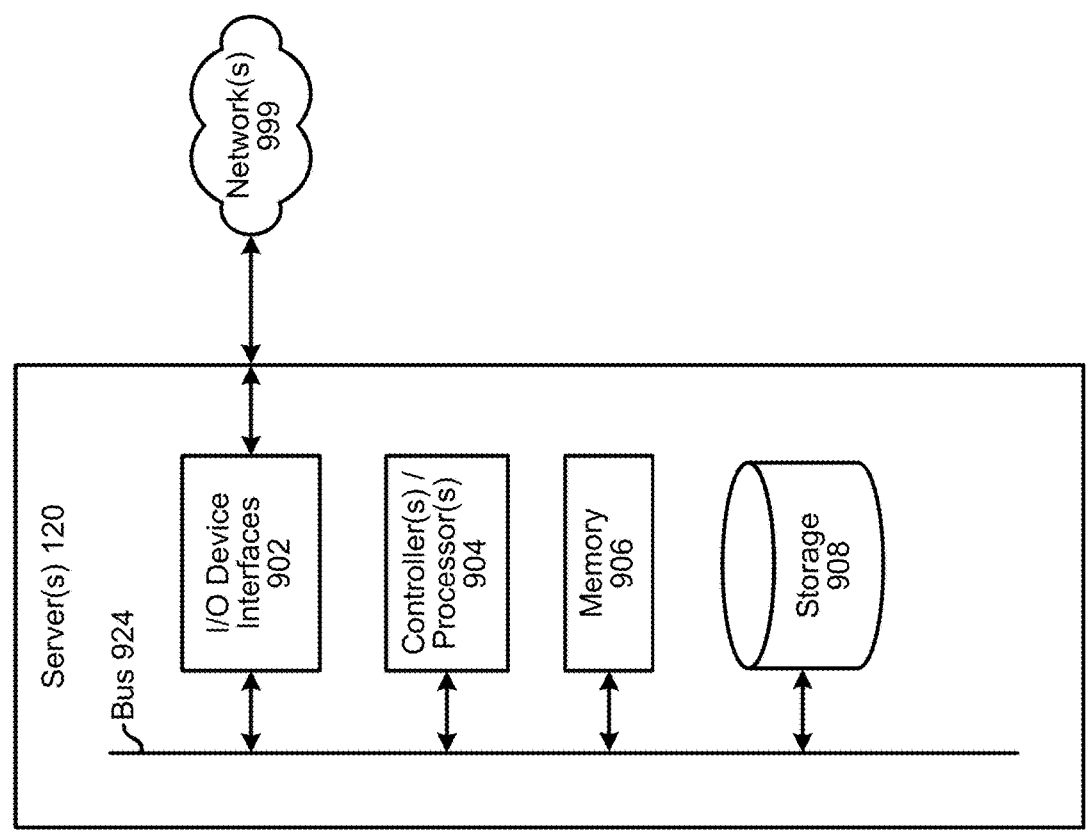

DISTRIBUTED MODEL TRAINING

BACKGROUND

Machine learning is a computing technique whereby a computing system can learn how to perform a specific task without explicitly being programmed to do so. Machine learning may be used to handle a number of different tasks of varying complexity. Machine learning computing may rely on trained models that are trained using training data sets. Once trained, a machine learning model may be capable of processing input data and producing output data that conforms to the function for which the model has been trained.

BRIEF DESCRIPTION OF DRAWINGS

For a more complete understanding of the present disclosure, reference is now made to the following description taken in conjunction with the accompanying drawings.

FIG. 6 is a conceptual diagram illustrating a distributed model training system according to embodiments of the present disclosure.

FIG. 8 is a conceptual diagram illustrating a regional distributed model training system according to embodiments of the present disclosure.

FIG. 9 is a block diagram conceptually illustrating example components of a server according to embodiments of the present disclosure.

DETAILED DESCRIPTION

Figure 1:
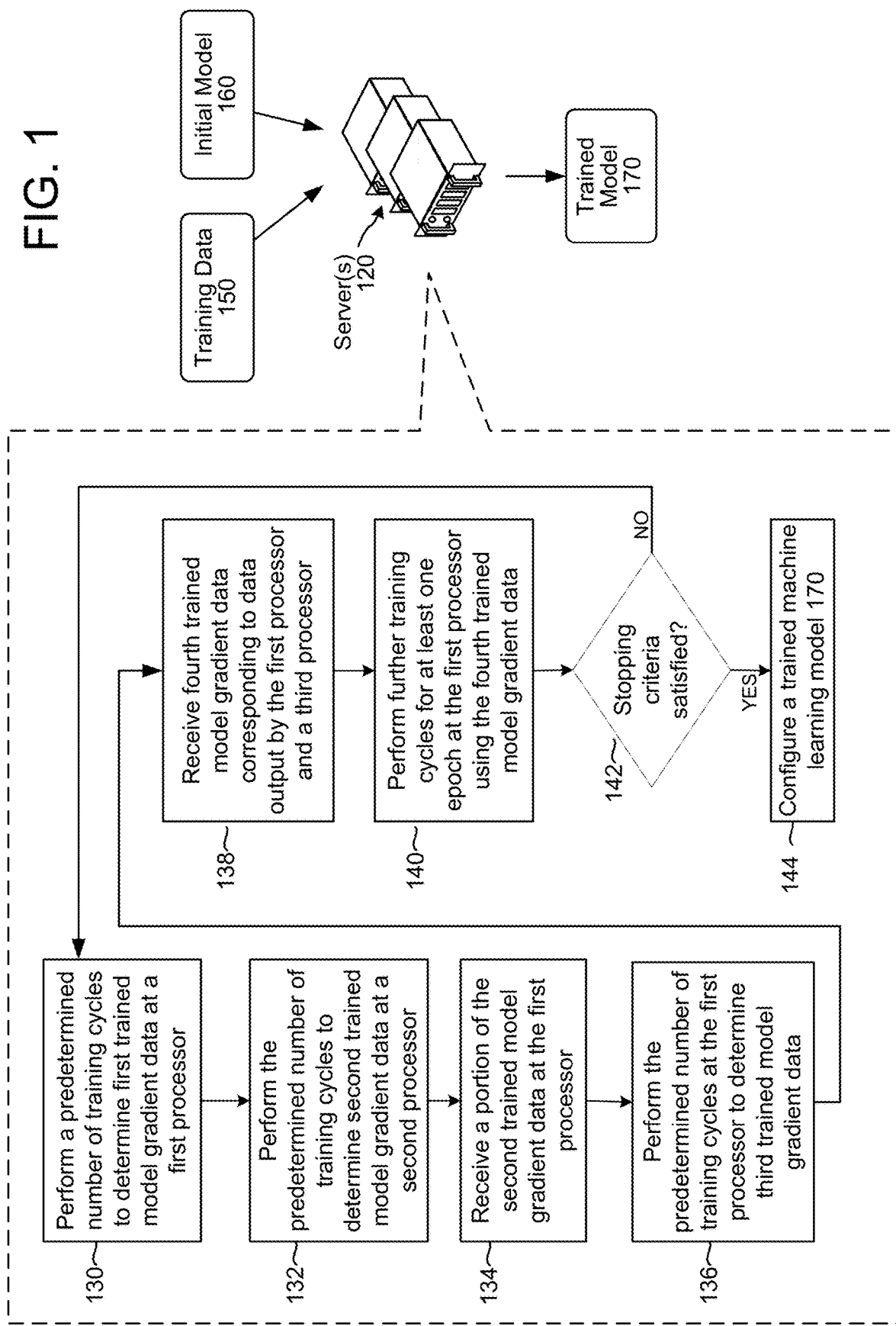
FIG. 1 illustrates a system for distributed model training according to embodiments of the present disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Training of a ML model can require a significant amount of computing resources. In particular, as use of larger training data corpuses may result in a more robust and accurately trained model, large training data corpuses (including thousands to millions of training examples) are not uncommon. To process those corpuses and train the corresponding models, model training may take several weeks or months of computing time, even when using powerful computing systems to train the model.

One of the approaches to reduce the computing time for training ML models is based on data parallel training, which uses multiple processors (for example, central processing units (CPUs), graphical processing units (GPUs)) to process different partitions of the training data. The parallel training problem can also be cast in a model-parallel framework which uses multiple processors to process the same training dataset but each processor focuses on generating different parameters. For sparsely structured connected layers, such as in a Convolutional Neural Network (CNN), it is often possible to relatively efficiently distribute the computation of each layer, and for fully-connected layers, each layer may be trained on a different node or processor. Model parallelism is particularly attractive for very large models that do not completely fit in the working memory of a single GPU, and has been successful for training a model using a small, tightly connected clusters of GPU devices. However, for densely connected networks, model parallelism is in practice often bounded by the number of layers in a deep neural network (DNN). In an example embodiment, the system described herein can be used for training a DNN model using data-parallel methods.

A data parallel method for training a machine learning model consists of multiple compute nodes consisting of one or more processors. Each node computes sub-gradients based on different partitions of the training data. The sub-gradients are the basis for updates to the weights of the machine learning model and the weight-updates should be synchronized across all compute nodes. Nominally, weight updates take up the same amount of memory as the model, which makes it challenging to synchronize weights after each mini-batch. This has led to exploration of methods that synchronize less frequently and other techniques for compressing the gradients.

Figure 2:
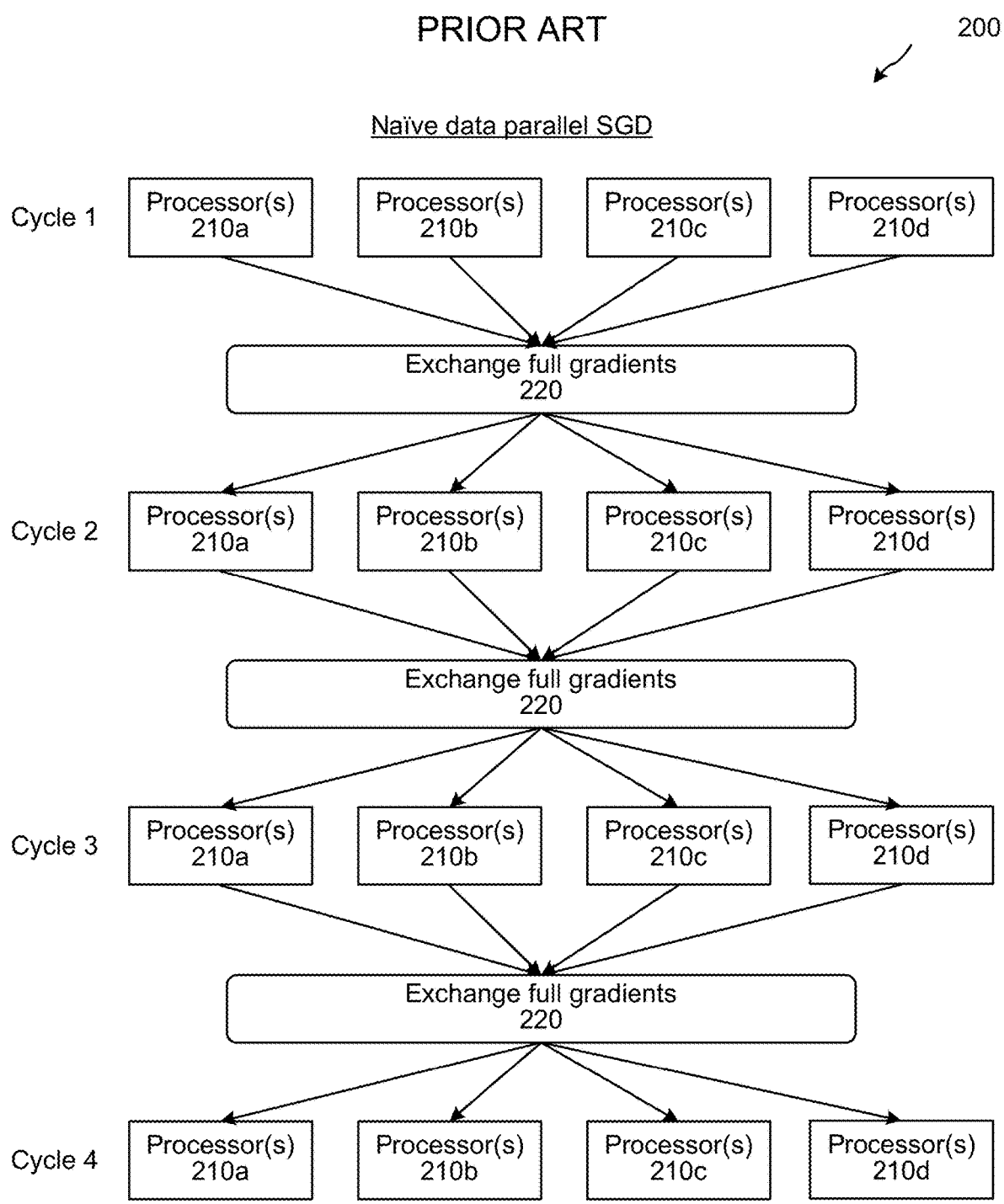
FIG. 2 is a conceptual diagram illustrating a distributed model training system of a machine learning model according to the prior art.

In one of the conventional methods of data parallel training, called the naive approach, entire weights of the neural network are communicated between all processors, which does not scale linearly as increasing the number of processors creates a communication bottleneck (discussed further in connection with FIG. 2). To reduce communication costs compressed gradients may be communicated between the processors (discussed further in connection with FIG. 3). This approach works well for less than 16 processors, but experiences a communication bottleneck when more than 16 processors are used to train the neural network model.

Another approach, called Blockwise Model Update and Filtering method (BMUF), addresses the communication bottleneck by invoking communication between processors after every K training cycles (discussed further in connection with FIG. 5) where the number for K is configurable. However, since there is no synchronization between the processors in the BMUF approach until K training cycles, the accuracy of the ultimate neural network may be reduced.

Described herein is a system that addresses communication bottleneck and accuracy problems of training a neural network model on large datasets using data parallel training methods. The distributed model training system described herein performs synchronization between a set of processors every training cycle and performs a full synchronization between the main processors every K training cycles. This approach increases accuracy of the neural network model and addresses the communication bottleneck caused by increasing the number of processors in training the neural network model. The approach can further take advantage of hardware architecture for reducing the training time. For example, a first set and second set of processors can be implemented on separate hosts, each equipped with multiple GPUs and leveraging peer-to-peer communication technology provided by the GPUs.

The system described herein can be advantageously used to train a neural network model on large number of nodes that are trained using a different dataset. For example, a first training dataset containing data for a particular geographic region may be used by a first set of processors for K training cycles, and a second training dataset containing data for another geographic region may be used by a second set of processors for K training cycles. The first and second set of processors communicate the model weights to achieve data parallel training. However, the communication cost of sending model weights between two regions may be expensive and hinders scalability of the distributed training approach. Using the system described herein, reduces the communication cost by communicating model weights only after K training cycles between processors in different regions, while communicating model weights between processors in the same region more frequently.

Thus, offered is a distributed model training system that synchronizes model weights between a set of processors every batch and synchronizes between the main processors every K training cycles to reduce communication costs (related to computational resources and time) between processors and to increase accuracy of the trained model.

The trained machine learning model configured or generated by the distributed model training system described herein can be used in various applications based on the training dataset and the initial model used for training. For example, the trained machine learning model can be used for automated speech recognition by a device, such as a smart speaker. The smart speaker device (or other backend device such as a server, etc.) may use the trained machine learning to analysis speech input received by a microphone of the smart speaker device and perform automatic speech recognition (ASR) to determine text based on the audio data. The trained machine learning model may, for example, be an acoustic model used to determine acoustic unit information from the audio data. The trained machine learning model may, for example, be a language model used to determine a sequence of words as part of ASR processing. The trained machine learning model may be used to perform natural language understanding (NLU). For example, the trained machine learning model may be used to determine what words of text may correspond to a named entity, a process known as named entity recognition. The trained machine learning model may be used to perform intent classification, where an intent associated with text data is determined. The trained machine learning model may also be used for other NLU processes such as entity resolution, etc. The trained machine learning model may also be used for other processes in processing a user command, such as directly producing NLU output data from audio data (thus potentially skipping an ASR process), determining an appropriate output by a smart speaker device, including an audio output or performance of some command, or other process. Alternatively, the trained machine learning model may be used to determine if the speech input included a wakeword for activating the smart speaker device.

In another example, the trained machine learning model can be used for image recognition or image classification. In other examples, the trained machine learning model may be used for video analytics, language translation, or many other examples depending on the desired operation and training data corresponding to the model.

Further, the training operations described herein may be offered as a service, where a customer can request that an operator of the system train a machine learning model from a set of training data. The techniques herein may be used to train the model in a parallel and distributed manner.

FIG. 1 illustrates a system for distributed model training according to embodiments of the present disclosure. Although the steps of FIG. 1, and other figures below, are discussed in a particular order, unless expressly stated otherwise the order of operations may be changed and still be within the scope of the present disclosure. As shown, server(s) 120 perform (130) a predetermined number of training cycles (e.g., K training cycles) at a first processor to determine first trained model gradient data. The server(s) 120 perform (132) the predetermined number of training cycles at a second processor to determine second trained model gradient data. The server(s) 120 may be provided training data 150 and an initial machine learning model 160 that are used in determining the first and second trained model gradient data.

The server(s) 120 may receive the training data 150 and the initial model 160 from some storage or other computing component in communication with server(s) 120. In certain configurations the training data 150 and the initial model 160 are stored in storage associated with server(s) 120. The training data 150 and the initial model 160 may also be uploaded to server(s) 120 by a user or other computer. The initial model 160 may also be accompanied by metadata or other information describing the initial model. The form of the data of the initial model 160 may include data describing the structure of the initial model (e.g., setting out the number of layers of a neural network) as well as data describing the specific operations of the initial model (e.g., setting out the operations performed by each layer and specifying the input data type and output data type of each layer). The data may also include model weights, weight values, parameters, or other model defining data. Other data may also be received with or as part of the initial model 160.

The server(s) 120 receive (134) a portion of the second trained model gradient data at the first processor. The portion of the second trained model gradient data may be determined according to techniques described in relation to, for example, FIG. 6. The server(s) 120 perform (136) the predetermined number of training cycles at the first processor using the portion of the second trained model gradient data to determine third model gradient data.

The server(s) 120 receive (138) fourth trained model gradient data corresponding to data output by the first processor and a third processor. The server(s) 120 perform (140) further training cycles for at least one epoch at the first processor using the fourth trained model gradient data. One epoch is when an entire dataset has been processed by the training system. In the example where a neural network is trained, an epoch is when the entire dataset has been passed forward and backward through the neural network once. After performing training cycles for at least one epoch, the server(s) 120 determine if the stopping criteria is satisfied. The stopping criteria may include a predefined number of epochs or training cycles. The stopping criteria may also include a desired accuracy threshold of the trained model data outputted by the processors in the system. If the stopping criteria is not satisfied, the server(s) 120 continue to train the machine learning model (130).

When the stopping criteria is satisfied, the server(s) 120 configure the trained machine learning model 170. In an example embodiment, the trained model 170 is configured by aggregating the trained model data outputted by all the processors in the system. In an alternative embodiment, the trained model 170 is configured by aggregated the trained model data outputted by two or more processors in the system, where each of the two or more processors (e.g., master processors) are chosen from a different set of processors. In this manner, the server(s) 120 generate a trained machine learning model 170.

In the distributed model training system described herein, each processor(s) trains a portion of a training dataset for a number of training cycles. Training starts with an initial model, and after the first number of training cycles, each processor(s) generates trained model data based on a first portion of the training dataset and by updating the initial model (for example, model weights or parameters). At the next number of training cycles, the processor(s) trains on a second portion of the training dataset using the trained model data, and generates new trained model data based by updated the previous trained model data (model weights or parameters). As such, after every training cycle the processor(s) generates different trained model data. With each training cycle, the resultant trained model is closer to producing the ground truth for the example training data that is provided to the training system. In the initial model, the weights may be randomly assigned weights, and each training cycle the system back propagates errors to determine appropriate weights for the model to achieve the correct ground truth. As used herein, a training cycle (also referred to as batch or mini-batch) is one or more iterations of processing training data to generate trained model data. The trained model data includes at least weights of the model, parameters of the model, or other data quantifying the model. As used herein, gradients or gradient data refers to a difference between the weights of two models.

FIG. 2 is a conceptual diagram illustrating a distributed model training system 200 according to the prior art. The system 200 employs naïve data parallel training with stochastic gradient descent (SGD), and is one of the conventional approaches for parallel data training of machine learning models. Parallel or distributed training of machine learning models is achieved by using multiple processors, for example processor(s) 210a, 210b, 210c and 210d, as shown in FIG. 2. Each of 210a, 210b, 210c and 210d may be one processor or more than one processor. Each of 210a, 210b, 210c and 210d may also be a CPU or a GPU with one or more processors per individual CPU/GPU.

Each processor(s) 210 may implement a training module that analyzes and processes data to train a machine learning model, for example a neural network model. Each processor(s) may use a different training dataset (or portion/sub-portion thereof) that includes similar type of data. For example, a large training dataset containing raw audio data and related metadata, raw image data and related metadata, and the like may be divided into four datasets, one for each processor(s) 210a, 210b, 210c and 210d to use. Alternatively, each of processor(s) 210a, 210b, 210c and 210d may be provided a separate training dataset containing audio data and related metadata. During each cycle of training, the processor(s) 210a, 210b, 210c, 210d trains on a subset of its respective training dataset.

In the system 200, each processor(s) 210 communicates data including full gradients of its respective trained model to a module 220 after every training cycle is executed. The module 220 facilitates exchange of the full gradients between the processors. For example, module 220 communicates data including information on the full gradients of the model generated by processor(s) 210a, 210b and 210c to processor(s) 210d. Similarly, module 220 communicates data including information on the full gradients of the model generated by processor(s) 210a, 210b and 210d to processor(s) 210c, and so on so each processor(s) can receive gradients calculated by the other processors. The exchange of data including full gradients of the model executed by each processor(s) is done after each cycle of training, as shown in FIG. 2. The processor(s) 210 continue to perform training cycles and exchange of gradient values until all of the training dataset is processed, and/or a stopping criterion is satisfied, resulting in a final trained machine learning model. The final trained machine learning model may be stored, and may be communicated to another server, processor, or device for use at runtime.

Assuming process 200 is used to train a neural network model, the new weights of the model for each processor after each cycle may be calculated using the following equation:

$$w' = w - \eta \sum_{i=0}^{N} \Delta w_i \quad (1)$$

where w is the weight of the neural networks, Δw represents gradients of the weights calculated from back-propagation algorithm, N is the total number of processors (in this example 4), and 77 is a configurable predefined hyperparameter that may be the learning rate of the model, may be the normalization parameter, and/or a combination of other parameters. The model gradients are summed from all processors after every cycle. This technique may not necessarily scale linearly, that is when more processors are added, the time to train the machine learning model increases.

Figure 3:
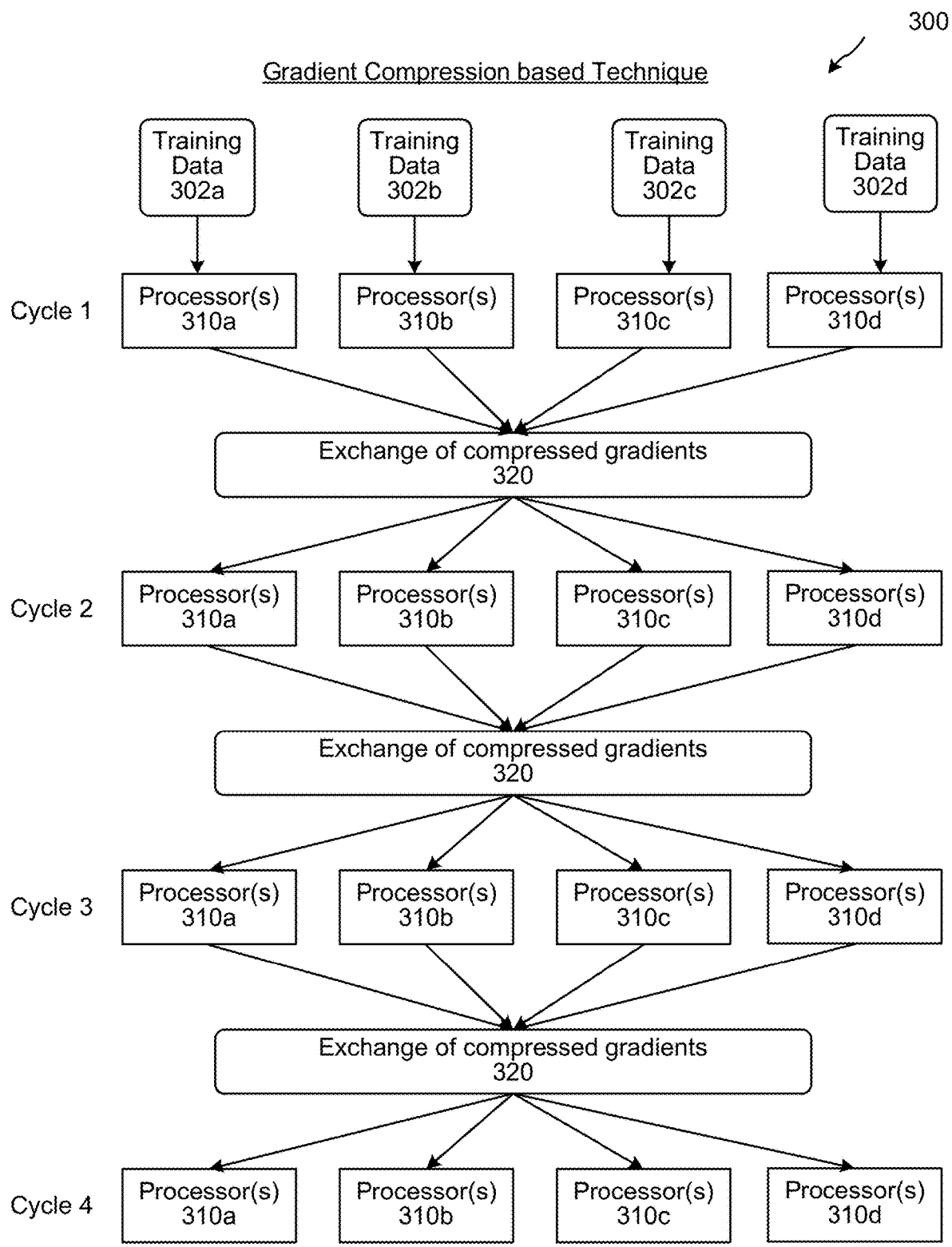
FIG. 3 is a conceptual diagram illustrating another distributed model training system of a machine learning model according to embodiments of the present disclosure.

FIG. 3 is a conceptual diagram illustrating a distributed model training system 300 according to embodiments of the present disclosure. The system 300 employs a gradient compression based method for parallel data training, and is another approach for parallel data training of machine learning models. Parallel or distributed training of machine learning models is achieved by using multiple processors, for example processor(s) 310a, 310b, 310c and 310d, as shown in FIG. 3. Each of 310a, 310b, 310c and 310d may be one processor or more than one processor. Each of 310a, 310b, 310c and 310d may also be a CPU or a GPU with one or more processor per individual CPU/GPU.

Each of processor(s) 310 may implement a training module that analyzes and processes data to train a machine learning model, for example a neural network model. Each processor(s) 310 may use a different training dataset (or portion/sub-portion thereof) that includes similar type of data. For example, a large training dataset containing raw audio data and related metadata, raw image data and related metadata, and the like may be divided into four datasets (e.g., 302a, 302b, 302c and 302d) one for each processor(s) 310a, 310b, 310c and 310d to use. Alternatively, each of processor(s) 310a, 310b, 310c and 310d may be provided a separate training dataset containing audio data and related metadata. During each cycle of training, the processor(s) 310a, 310b, 310c, 310d trains on a subset or sub-portion of its respective training dataset.

In process 300, module 320 facilitates the exchange of data between the processors after a predetermined number (e.g., K) of training cycles. The data includes respective compressed gradient information of the model generated by each respective processor(s) 310a, 310b, 310c, 310d after executing the predetermined number of training cycles. The gradients for each model is compressed (or reduced) using thresholding and quantization techniques discussed in further detail below with respect to FIG. 6. Instead of communicating entire weight gradients of the models, gradients above a threshold are filtered out and quantized (represented by function Q in equation 2 below). Assuming process 300 is used to train a neural network model, the new weights of the model computed by each processor after each training cycle are calculated using the following equation:

$$w' = w - \eta \sum_{i=0}^{N} Q(\Delta w)_i \quad (2)$$

where w is the weight of the neural networks, Δw represents gradients of the weights calculated from backpropagation algorithm, N is the total number of processors (in this example 4), Q is a quantization function, and $\eta$ is a configurable predefined hyperparameter that may be the learning rate of the model, may be the normalization parameter, and/or a combination of other parameters. The compressed model gradients are summed from all processors after a predetermined number of cycles. The processor(s) 310 continue to perform training cycles and exchange of gradient values until all of the training dataset is processed, and/or a stopping criterion is satisfied, resulting in a final trained machine learning model. The final trained machine learning model may be stored, and may be communicated to another server, processor, or device for use at runtime. This technique scales well until 32 processors, but communication may become a bottleneck with increased number of processors as shown in FIG. 4.

Figure 4:
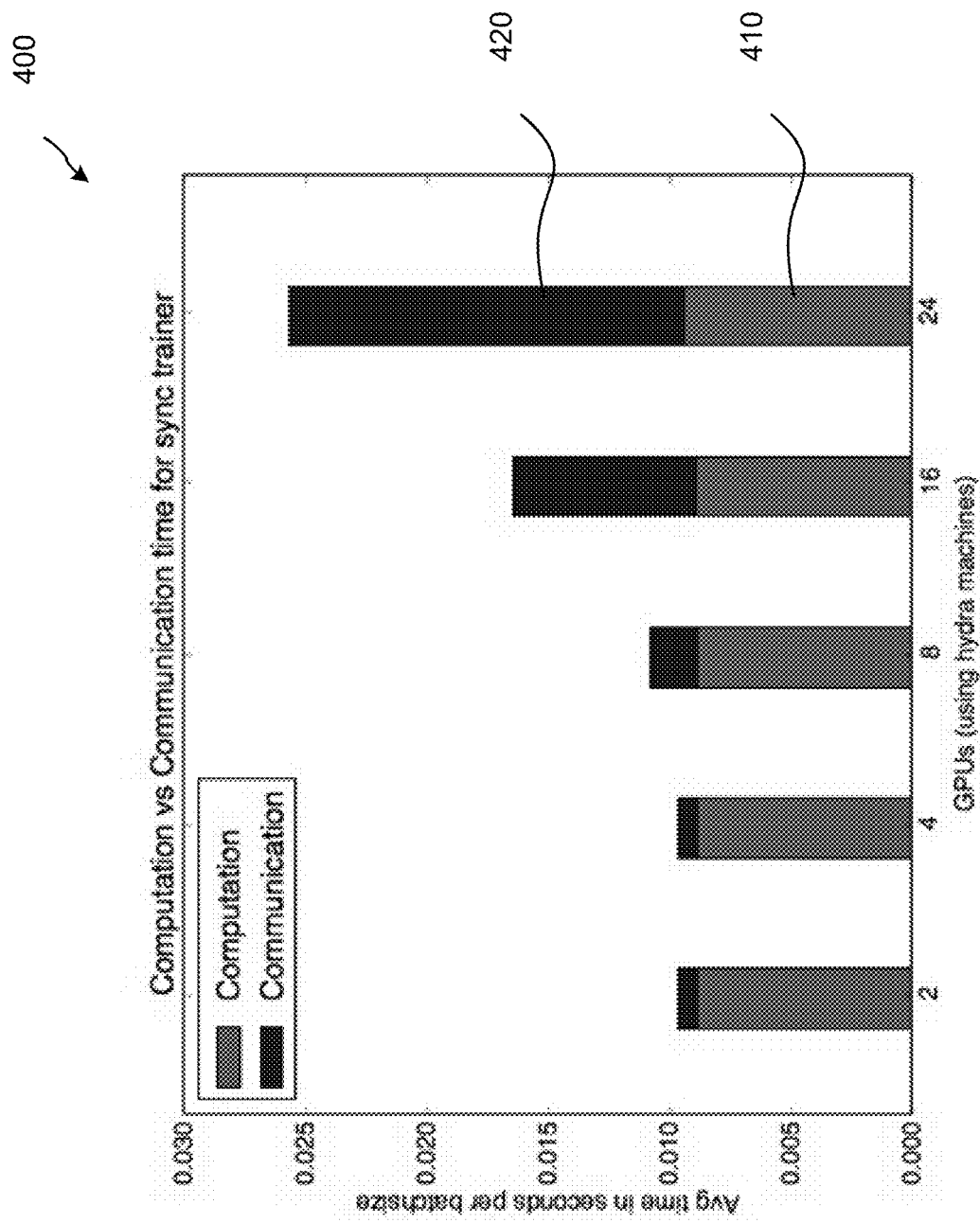
FIG. 4 is a graph illustrating computation versus communication time for the distributed model training system of FIG. 3.

FIG. 4 is a graph 400 illustrating computation and communication time for the distributed model training process described in connection with FIG. 3. As it can be seen from the figure, the computation time 410 remains about the same as the number of GPUs is increased (represented by the x-axis). However, the communication time 420 for communicating the compressed gradients among the processors increases as the number of processors increases. Thus, communication becomes a bottleneck in the compressed gradient based method of parallel training machine learning models as the number of processors are increased. The compressed gradient based method of parallel training may scale better than the naïve data parallel training method described in connection with FIG. 2 when applied to large numbers of processors.

Figure 5:
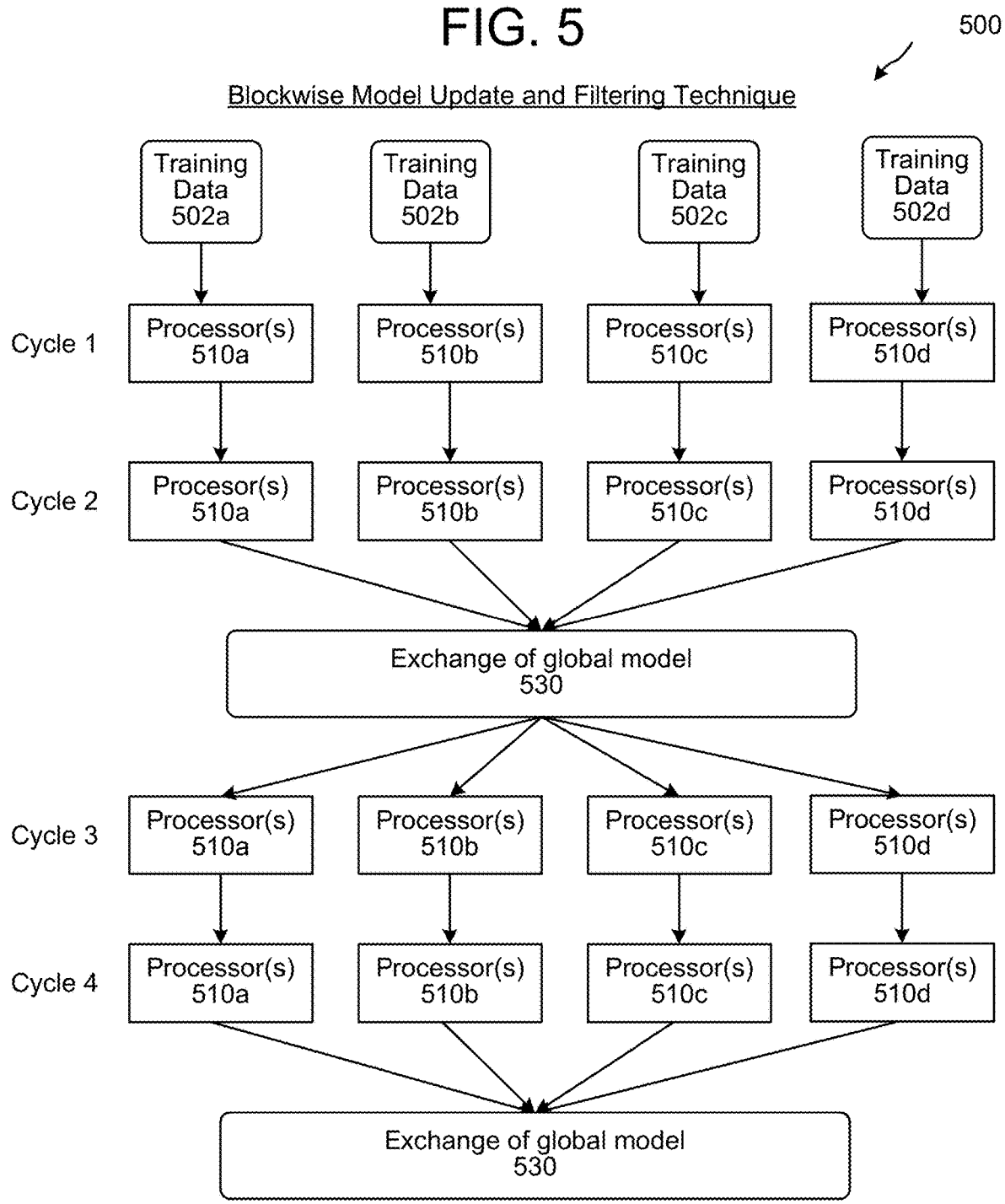
FIG. 5 is a conceptual diagram illustrating another distributed model training system of a machine learning model according to embodiments of the present disclosure.
Figure 7A:
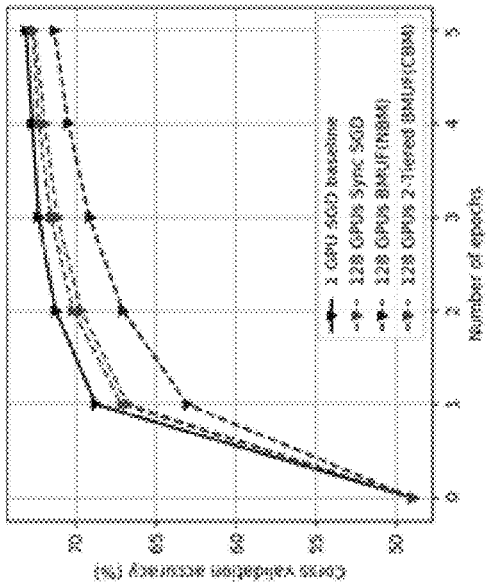
FIGS. 7A, 7B, 7C and 7D are graphs comparing the accuracy of the model trained using the distributed training method described herein with the accuracy of the models trained using other systems.
Figure 7B:
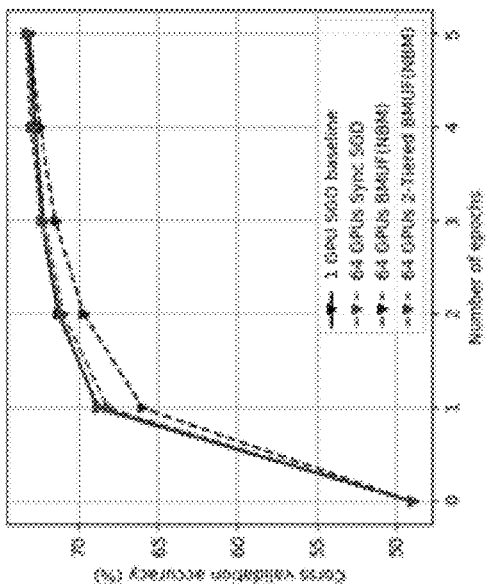
Figure 7C:
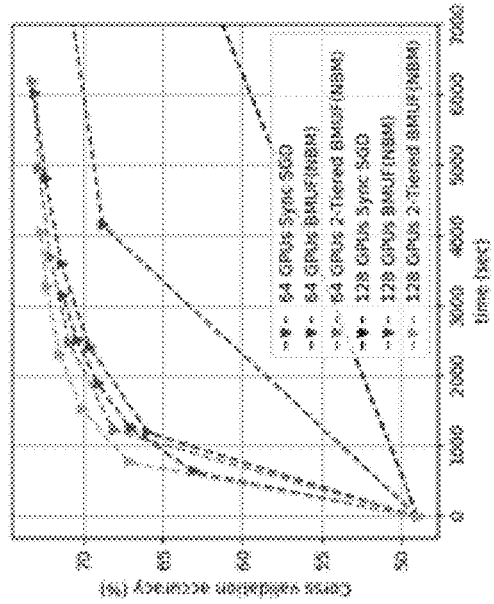
Figure 7D:
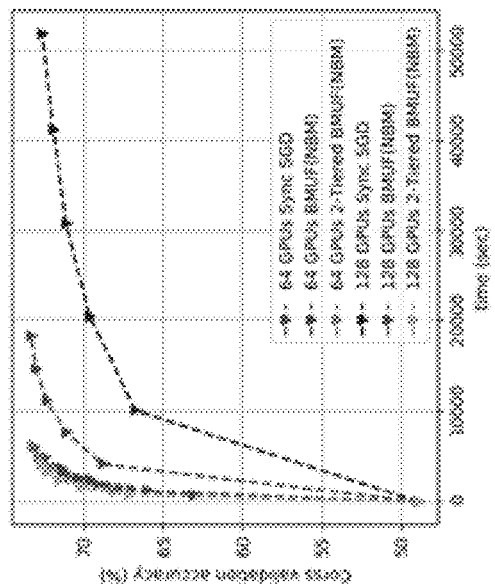

FIG. 5 is a conceptual diagram illustrating a distributed model training system 500 according to embodiments of the present disclosure. The system 500 employs a blockwise model update and filtering (BMUF) method, and is another approach for parallel data training of machine learning models. Parallel or distributed training of machine learning models is achieved by using multiple processors, for example processor(s) 510a, 510b, 510c and 510d, as shown in FIG. 500. Each of 510a, 510b, 510c and 510d may be one processor or more than one processor. Each of 510a, 510b, 510c and 510d may also be a CPU or a GPU with one or more processors per individual CPU/GPU.

Each of processor(s) 510 may implement a training module that analyzes and processes data to train a machine learning model, for example a neural network model. Each processor(s) 510 may use a different training dataset (or portion/sub-portion thereof) that includes similar type of data. For example, a large training dataset containing raw audio data and related metadata, raw image data and related metadata, and the like may be divided into four datasets (e.g., 502a, 502b, 502c, and 502d), one for each processor(s) 510a, 510b, 510c and 510d to use. Alternatively, each of processor(s) 510a, 510b, 510c and 510d may be provided a separate training dataset containing audio data and related metadata. During each cycle of training, the processor(s) 510a, 510b, 510c and 510d trains on a subset or sub-portion of its respective training dataset.

In system 500, each processor(s) 510a, 510b, 510c, 510d updates its model from its local gradient values after a first training cycle, without communicating the gradient values to the other processors, as shown in FIG. 5 between cycle 1 and cycle 2. Each processor(s) 510a, 510b, 510c, 510d updates it local model using the below equation:

$$W'_i = W_i - \eta \Delta W_i \quad (3)$$

After cycle 2, each processor(s) 510a, 510b, 510c, 510d communicates its model data, via module 530, to the other processor(s). The model data from each processor(s) 510a, 510b, 510c, 510d is aggregated and updated using a BMUF algorithm (discussed in detail below with respect to FIG. 6) resulting in a new global model. The global model data is communicated to each processor(s) 510a, 510b, 510c, 510d for processing at cycle 3. The global model data may be calculated using the below equation:

$$w = BMUF\left(\sum_{i=0}^{N} w'_i\right) \quad (4)$$

The processor(s) 510 continue to perform training cycles and exchange of updated global model data until all of the training dataset is processed, and/or a stopping criterion is satisfied, resulting in a final trained machine learning model. The final trained machine learning model may be stored, and may be communicated to another server, processor, or device for use at runtime. Because the BMUF approach described in connection with FIG. 5 synchronizes model data less frequently, the trained machine learning model is less accurate.

The present system, illustrated in FIG. 6, improves on these processes as discussed below. FIG. 6 is a conceptual diagram illustrating a distributed model training system 600 according to embodiments of the present disclosure. The process 600 addresses the communication bottleneck issues and accuracy problems associated with the other systems described above. The system 600, as can be seen in the figure, performs synchronization between some of the processors after a first number of cycles (here cycle 1), and performs full synchronization between all the processors after a second number of cycles (here cycle 2). This approach increases accuracy of the machine learning model while providing the same communication latency as the BMUF approach.

The distributed model training system described herein comprises of multiple compute nodes, where each compute node includes one or more processors (e.g., one or more GPUs). In an example embodiment, each compute node (e.g., processor(s) 610a, processor(s) 610b, processor(s) 610c, and processor(s) 610d) has a local replica of an initial machine learning model (e.g., neural network model, DNN, CNN, etc.) and computes gradients based on different partitions of the training data. Gradients are computed in parallel for different training cycles of data at each node. The gradients are the basis for updates to the weights of the machine learning model and the weight-updates should be synchronized across all compute nodes. One of the techniques for reducing training time includes mini-batching, where updates of gradients for individual samples are delayed until the end of a particular training cycle. The distributed model training system described herein employs a partial synchronization step between a set of processors for a first predetermined number of training cycles, and a full synchronization step between all of the processors for a second predetermined number of training cycles. In an example embodiment, the first and second predetermined number of training cycles may be the same number, so that the system 600 is performing a partial synchronization or a full synchronization after every predetermined number of training cycles. In another embodiment, the first predetermined number of training cycles for performing a partial synchronization may be different that the second predetermined number of training cycles for performing a full synchronization. The predetermined number of training cycles for performing synchronizations may preferably be in the range of 1 to 128 (though other values may be used). For ease of explanation, assume that the predetermined number of training cycles is 1, and as shown in FIG. 6, a partial synchronization among a set of processors (e.g., processor(s) 610a and 610b) occurs after training cycle 1 and training cycle 3, and a full synchronization between multiple sets of processors (e.g., processor(s) 610a and 610c) occurs after training cycle 2 and training cycle 4. In an example embodiment, the predetermined number of training cycles may be 2, in which case the first partial synchronization among the set of processors may occur after training cycle 2, the first full synchronization between the multiple sets of processors occurs after training cycle 4, the second partial synchronization among the set of processors may occur after training cycle 6, the second full synchronization between the multiple sets of processors occurs after training cycle 8, and so on. In another example embodiment, the predetermined number of training cycles may be 3, in which case the first partial synchronization among the set of processors may occur after training cycle 3, the first full synchronization between the multiple sets of processors occurs after training cycle 6, the second partial synchronization among the set of processors may occur after training cycle 9, the second full synchronization between the multiple sets of processors occurs after training cycle 12, and so on.

In another embodiment, a partial synchronization may occur after every first predetermined number of training cycles (K), and a full synchronization may occur after every second predetermined number of training cycles (L). The value of K may be different than the value of L. For example, a partial synchronization may occur every 2 training cycles (K=2), and a full synchronization may occur every 5 training cycles (L=5). That is, a partial synchronization occurs at training cycle 2, training cycle 4, and so on, while the full synchronization occurs at training cycle 5, training cycle 10 and so. As such, more than one partial synchronization may occur before a full synchronization occurs.

The distributed model training system described herein, may be referred to a hybrid approach because of the use of partial synchronization and full synchronization techniques. In the partial synchronization technique, a portion of the gradient model data is communicated among a set of processors. The portion that is not communicated, for example the gradient residual, may be communicated in another form, as discussed in detail below.

In an example embodiment, the partial synchronization step includes synchronization based on compressed gradients of the models generated by each processor in the set of processors. One observation made is that gradients are very sparse. Typically the weights of a fully connected DNN model, for example, are sparsely distributed with most weights close to zero, which causes the gradients to be sparse also. Furthermore, since gradients are based on a small amount of the training data they are often even sparser than the weight distribution. Based on these observations, the system described herein communicates a portion of the gradient values (also referred to as "compressed gradient values" herein) and only updates a small fraction of the weights after each predetermined number of training cycles. Elements of the gradient that are near zero may be delayed much longer than the predetermined number of training cycles.

To determine the portion of gradient values that are communicated to the other processors for synchronization, the system compacts gradients by considering only gradient elements whose absolute values exceed a threshold. In an example embodiment, the system constructs maps to code the resulting sparse gradient key-value, where keys are the indices into the full gradient and values are the corresponding individual gradient element. In an example embodiment, the map is encoded in an integer vector. In other embodiments, the map may be encoded in an appropriate data structure, such as, a data vector, a data array, a data matrix, and the like to store the sparse gradient key-value. These maps constitute the trained model gradient data communicated by the module 605. Because gradients are very sparse, this leads to a great bandwidth reduction compared to transmitting the full gradient matrices. To reduce the bandwidth used for memory copy operations between the host and the processor, the compaction of the gradient is most efficiently done on the respective processor in an example embodiment. As described herein, the system of the present disclosure does not explicitly synchronize the model weights. Instead the system applies a technique sometimes referred to as "dead reckoning", that is, sender processors communicate deltas of individual model weights to all other compute nodes, and receiver processors apply the deltas to the local replica of the machine learning model. For local copies of the trained model to stay synchronized among a set of processors, all compute nodes within the set receive the same deltas and apply them with the same logic. The deltas may be received in different orders as long as the update logic is commutative. The deltas of model weights is determined based on a comparison of an initial model (or a locally stored model that is updated after a predetermined number of training cycles) and a trained model generated by a processor(s) after executing a predetermined number of training cycles on a sub-portion of a partitioned training dataset.

In an example embodiment, each compute node aggregates gradient values into a gradient residual, so that gradient values below the threshold are accounted for. This ensures that weights with small but biased sub-gradient values are eventually updated, albeit at a lower update frequency. Only elements of the residual that exceed the threshold T are encoded in key-value maps and communicated to other processors in the set and then subtracted from the residual.

In an example implementation, each gradient element is encoded as two numbers; an integer element index and the floating point gradient element. The gradient element is quantized, and both the quantized gradient and the index is packed in a single 32-bit integer field. The quantization error is not discarded but added back to the gradient residual. The compute nodes communicate weight deltas of +τ or −τ, and 31 bits of address space is left for the index.

Peer-to-peer messages can be further compressed by entropy coding in an example embodiment. The quantized update messages are sorted sets of integers. The gaps between the integers have lower entropy than the absolute values. Coding the gaps reduces the average size per weight update to 10-11 bits, representing an additional 3× compression.

The following pseudo code describes an exemplary training cycle in a single compute node (e.g., processor(s) 610*a*) of the system 600. This is the special case of 1-bit quantization.

1. Load feature vectors and supervision targets for a training cycle
2. Compute a sub-gradient $G^{(s)}$ by back-propagation
3. Aggregate the sub-gradient in the gradient residual $G^{(r)} = G^{(r)} + G^{(s)}$
4. Reset the message map M
5. For each element $gi^{(r)}$ of $G^{(r)}$:
6. If $gi^{(r)} > \tau$ then push the pair $\{i, +\tau\}$ to the message M
    Subtract τ from residual: $gi^{(r)} = gi^{(r)} - \tau$ Else if $gi^{(r)} < -\tau$ then push the pair $\{i, -\tau\}$ to the message M
    Add τ to the residual: $gi^{(r)} = gi^{(r)} + \tau$
7. Compress M and send to all other compute nodes
8. Receive and uncompress any weight update messages from other compute nodes and apply them to the local replica of the model
9. Apply M to the local replica of the model In this manner, the system can determine a portion of gradient value data for partial synchronization among a set of processors after a predetermined number of training cycles.

In an example embodiment, the full synchronization step (shown in FIG. 6 between cycle 2 and cycle 3) uses the BMUF approach, where each compute node updates its local model based on local gradients computed by the processor for a predetermined number of training cycles. This results in separate trained models on each of the compute nodes. The separate trained models are aggregated together and updated resulting in a new global model that is used by each compute node for the next predetermined number of training cycles.

After the partial synchronization among a set of processors, each compute node stores a trained local model generated after performing a number of training cycles. At the full synchronization step, in an example embodiment, at least one of the processors from the set of processors sends its trained model to the module 630. The module 630 aggregates the received trained local models, for example, by averaging them (denoted as W(t) here). Instead of using W(t) as the new global model for the next training cycles, under the BMUF approach the new global model is calculated as follows:

Firstly, G(t) is calculated, denoting the model-update resulting from a block of data $$G(t) = W(t) - W_g(t-1) \tag{5}$$

Then, the global model update Δ(t) is calculated per the below equation:

$$\Delta(t) = \eta_t \Delta(t-1) + \xi G(t), 0 \leq \eta_t < 1, \xi > 0 \tag{6}$$

Consequently, the global model is updated as $$W(t) = W(t-1) + \Delta(t) \tag{7}$$

Equation (6) generates a model-update vector by filtering G(t) with the previous update vector. In this equation, lit indicates a block-level momentum and indicates the block learning rate. Before processing the next data block, a global model W g (t) is communicated to all of the processors to initialize their local models. The global model W g (t) can be calculated as follows for Classical Block Momentum scheme:

$$W_g(t) = W(t) \tag{8}$$

The global model $W_g(t)$ can be calculated as follows for Nesterov Block Momentum scheme:

$$W_g(t) = W(t) + \eta_{t+1} \Delta(t) \tag{9}$$

The partial synchronization step and full synchronization step are performed for every alternate predetermined number of training cycles until all of the training dataset is processed, and/or a stopping criterion is satisfied, resulting a final trained machine learning model. The final trained machine learning model may be stored, and may be communicated to another server, processor, or device for use at runtime.

In alternative embodiments, the partial synchronization step may employ other techniques for synchronizing the model weights, such as, model averaging, communication of full gradients, or the like. In alternative embodiments, the full synchronization step may employ other techniques for synchronizing the model weights, such as, model averaging, communication of full gradients, communication of compressed gradients or the like.

In detail, the distributed model training system 600 employs multiple processor(s), for example processor(s) 610*a*, 610*b*, 610*c* and 610*d*, as shown in FIG. 6. Each of 610*a*, 610*b*, 610*c* and 610*d* may be one processor or more than one processor. Each of 610*a*, 610*b*, 610*c* and 610*d* may also be a CPU or a GPU with one or more processors per individual CPU/GPU.

Each of processor(s) 610 may implement a training module that analyzes and processes data to train a machine learning model, for example a neural network model. Each processor(s) 610 may use a different training dataset (or portion/sub-portion thereof) that includes similar type of data. For example, a large training dataset containing audio data and related metadata may be divided into four datasets, training data 602*a* (e.g., a first portion of a training dataset), training data 602*b* (e.g., a second portion of the training dataset), training data 602*c* (e.g., a third portion of the training dataset) and training data 602*d* (e.g., a fourth portion of the training dataset), one for each processor(s) 610a, 610b, 610c and 610d to use to train a neural network model. Alternatively, each of processor(s) 610a, 610b, 610c and 610d may be provided a separate training dataset containing audio data and related metadata to train a neural network model for speech recognition. As another example, the training dataset may include images and related metadata, and the processor(s) 610a, 610b, 610c and 610d use the training data to train a machine learning model for image recognition or classification. During each cycle of training, the processor(s) 610a, 610b, 610c, 610d trains on a subset of its respective training dataset. As such, for each predetermined number of training cycle, each processor(s) is training on a different portion of the training dataset.

In system 600, processor(s) 610a (e.g., one or more first processors) and processor(s) 610b (e.g., one or more second processors) are part of a set of processors as shown by the dotted lines, and communicate its model data to the module 605 after a first predetermined number of training cycles (e.g., training cycle 1). The trained model gradient data is determined by processor(s) 610a (e.g., first trained model gradient data) using a sub-portion of its respective portion of the training dataset (e.g., a first sub-portion of the first portion of the training dataset) after executing or performing a predetermined number of training cycles. Processor(s) 610b determines trained model gradient data (e.g., second trained model gradient data) using a sub-portion of its respective portion of the training dataset (e.g., a second sub-portion of the second portion of the training dataset) after performing or executing the predetermined number of training cycles. The module 605 determines compressed gradient values of the trained model gradient data generated by the processor(s) 610a and 610b according to techniques described above. The compressed gradient values are communicated to the processor(s) 610a and 610b to use to determine further trained model gradient data for the next predetermined number of cycles. A similar method is performed with respect to processor(s) 610c and processor(s) 610d.

Processor(s) 610c (e.g., one or more third processors) and processor(s) 610d (e.g., one or more fourth processors) are part of another set of processors as shown by the dotted lines. The processor(s) 610c and processor(s) 610d communicate trained model gradient data to the module 615 after a predetermined number of training cycles (for example training cycle 1). The trained model gradient data is generated by processor(s) 610c and processor(s) 610d using its sub-portion of respective training dataset (e.g., a third sub-portion of the third portion and a fourth sub-portion of the fourth portion of the training dataset) after performing or executing for the predetermined number of cycles. The module 615 determines compressed gradient values of the trained model gradient data generated by the processor(s) 610c and 610d according to techniques described above. The compressed gradient values are communicated to the processor(s) 610c and 610d to use determine further trained model gradient data after performing or executing the next predetermined number of training cycles. In this manner, partial synchronization is performed among the processors of a first set of processors (e.g., 610a and 610b) and among the processors of a second set of processors (e.g., 610c and 610d). After a second predetermined number of training cycles (for example training cycle 2), a model (e.g., a first model) generated by the processor(s) 610a is communicated to module 630. This model is generated by processor(s) 610a using the compressed gradient values communicated by the module 605. A model (e.g., a fourth model) generated by the processor(s) 610c is also communicated to the module 630 after the predetermined number of training cycles. After the second predetermined number of training cycles, the model generated by processor(s) 610a may be identical to the model generated by processor(s) 610b. Similarly, the model generated by processor(s) 610c may be identical to the model generated by processor(s) 610d after the second predetermined training cycles. The system described herein takes advantage of this and communicates the model from one of the processors in the set for the full synchronization step, instead of communicating the model from all of the processors.

The module 630 facilitates the exchange of a global model update with respect to the model provided by the processor(s) 610a and 610c. The global model update is communicated to each processor(s) 610a, 610b, 610c, and 610d for the next training cycle.

In an example embodiment, each set of processors may have a designated master processor(s). For example, in FIG. 6, the processor(s) 610a and the processor(s) 610c may be the designated master processor(s) for their respective sets of processors. In an example embodiment, processor(s) 610b may communicate model data generated after the predetermined training cycles (for example, cycle 2 in FIG. 6) to processor(s) 610a. The processor(s) 610a may aggregate the model data generated by itself and the model data communicated by the processor(s) 610b, and communicate the aggregated model data to the module 630 for the exchange of the global model update. Similarly, the processor(s) 610d may communicate model data generated after the predetermined training cycles (for example, cycle 2 in FIG. 6) to processor(s) 610c. The processor(s) 610a may aggregate the model data generated by itself and the model data communicated by the processor(s) 610b, and communicate the aggregated model data to the module 630 for the exchange of the global model update.

In this manner, full synchronization is performed among all the processors based on the master processors of the first set of processors and the second set of processors (e.g., 610a and 610c). Rather than communicating the model data from all of the processors to the module 630, model data from one of the processors of the set of processors is communicated. Since synchronization among the set of processors was performed before, the system reduces communication costs by only communicating model data of one of the processors of the set of processors. Although the figure shows model data from processor(s) 610a and 610c being communicated to the module 630, it should be understood that model data from processors 610b and/or 610d may be communicated to the module 630.

In another embodiment, model data from all the processors (e.g., 610a, 610b, 610c and 610d) may be communicated to the module 630 to determine global gradient updates.

In an example embodiment, the full synchronization between training cycle 2 and training cycle 3 is performed according to the BMUF approach described above. In this case, processor(s) 610a sends a model (e.g., second model) to the module 630, where the second model is generated by updating the local model (e.g., the first model) using the trained model gradient data (e.g., third trained model gradient data) determined after training cycle 2. The processor(s) 610a receives an updated global model (e.g., a third model) from module 630 that is generated using the BMUF approach (equations 5, 6, and 7) described above.

For the next predetermined number of cycles (for example training cycle 3), each processor(s) 610a, 610b, 610c, and

610*d* generates model gradient data based on the global gradient updates or the global model communicated by the module 630. The processor(s) 610*a* and 610*b* communicates its model data to the module 605 after the next predetermined number of training cycles (here training cycle 3). The module 605 determines compressed gradient values of the model data generated by the processor(s) 610*a* and 610*b*. The compressed gradient values are communicated to the processor(s) 610*a* and 610*b* to use during execution of its training module for the next predetermined number of training cycles (here training cycle 4). Like the previous training cycles, a similar method is performed with respect to processor(s) 610*c* and processor(s) 610*d* using the module 615.

After a fourth predetermined number of cycles (here training cycle 4), model data generated by the processor(s) 610*a* and the processor(s) 610*c* is communicated to module 630. This process continues for multiple cycles depending on how long it takes to train the machine learning model. In an example embodiment, the total number of processors N are divided into M sets of P as follows:

$$P = \frac{N}{M}.$$

Assuming process 600 is used to train a neural network model, the new weights of the model for each processor after synchronizing compressed gradients is calculated using the following equation:

$$w' = w - \eta \sum_{i=0}^{P} Q(\Delta w)_i \quad (8)$$

where w is the weight of the neural networks, Δw represents gradients of the weights calculated from backpropagation algorithm, P is the number of processors in each set, and Q is a quantization function. This results in M different models from M sub-groups. These M models are updated together per the following equation:

$$w = BMUF\left(\sum_{i=0}^{M} w'_i\right) \quad (9)$$

Although four processors are shown in FIG. 6, it should be understood that more than four processors can be employed. For example, six processors may be employed in 3 sets, with each set synchronizing compressed gradients among each other after a first predetermined number of cycles, and one or all of the processors in each set communicating model data after a second predetermined number of cycles for exchange of global gradient updates among all of the six processors.

Although a set of processors is shown in FIG. 6 as including two processors, it should be understood that a set of processors may be formed by more than two processors. For example, each set of processors may include three processors. After the first predetermined number of cycles, the three processors in the set of processors synchronize compressed gradients, and after the second predetermined number of cycles, one or more of the three processors communicates model data for exchange of global gradient updates among all of the processors.

FIGS. 7A, 7B, 7C and 7D are graphs comparing the accuracy of the model trained using the distributed training method described herein (FIG. 6) with the accuracy of the models trained using other methods (FIGS. 2, 3 and 5). As it can be seen in FIG. 7A (for 64 processors) and 7B (for 128 processors), the accuracy of the model trained using the method described herein is comparable with the accuracy of the model trained using the method of FIG. 3 over a particular number of epochs (represented by the x-axis). Further as illustrated in the graphs, the accuracy of the model trained using the method described herein is better than the accuracy of the model trained using the system of FIG. 5 over a number of epochs. As it can be seen in FIGS. 7C and 7D, over time (represented by the x-axis in seconds) the accuracy of the model trained using the method described herein has a faster rate of convergence than the models trained using the other methods.

FIG. 8 is a conceptual diagram illustrating a regionally distributed model training system 800 according to embodiments of the present disclosure. In an example use of the distributed model training system described herein, different sets of processors can be trained using different sets of training data. For example, as shown in FIG. 8, processor(s) 810*a* and 810*b* form a set of processors that receive portions of a first training dataset, training data 802*a* and training data 802*b*. Processors 810*c* and 810*d* form another set of processors and receive portions of a second training dataset, training data 803*a* and training data 803*b*. In an example embodiment, each set of processors may be included in separate hosts (for example, network host, server host, or other device hosts). For example, processors 810*a* and 810*b* may be included in a first host, while processors 810*c* and 810*d* may be included in a second host. The first training dataset may be data obtained from a first geographical region, while the second training dataset may be data obtained from a second geographical region. Moreover, the first set of processors 810*a* and 810*b* may be located in the first geographical region, while the second set of processors 810*c* and 810*d* may be located in the second geographical region. More than one set of processors may be assigned or implemented in a particular geographic region, and the training dataset for the particular geographic region may be partitioned among all the processors within the system for that geographic region. Using the system described herein, one can avoid communicating large amounts of data from different geographical regions but still take advantage of the trained model data during the full synchronization step as shown in FIG. 8. In an example embodiment, the communication cost can be reduced by communicating gradient model values only after a predetermined number of training cycles between compute nodes located in different regions, while communicating more frequently among compute nodes in the same region.

FIG. 9 is a block diagram conceptually illustrating example components of a computing device, such as the server(s) 120, which may perform distributed model training as disclosed herein. Multiple servers 120 may be included in the system, such as one set of servers 120 for generating first and second model data, one set of servers 120 for generating fourth model data, etc. In operation, each of these devices (or groups of devices) may include computer-readable and computer-executable instructions that reside on the respective device 120, as discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each of device(s) 120 may include one or more controllers/processors 904, which may each include a central processing unit (CPU) or a graphical processing unit (GPU) for processing data and computer-readable instructions, and a memory 906 for storing data and instructions of the respective device. The memories 906 may individually include volatile random access memory (RAM), non-volatile read only memory (ROM), non-volatile magnetoresistive memory (MRAM), and/or other types of memory. Each device 120 may also include a data storage component 908 for storing data and controller/processor-executable instructions. Each data storage component 908 may individually include one or more non-volatile storage types such as magnetic storage, optical storage, solid-state storage, etc. Each device 120 may also be connected to removable or external non-volatile memory and/or storage (such as a removable memory card, memory key drive, networked storage, etc.) through respective input/output device interfaces 902.

Computer instructions for operating each device 120 and its various components may be executed by the respective device's controller(s)/processor(s) 904, using the memory 906 as temporary "working" storage at runtime. A device's computer instructions may be stored in a non-transitory manner in non-volatile memory 906, storage 908, or an external device(s). Alternatively, some or all of the executable instructions may be embedded in hardware or firmware on the respective device in addition to or instead of software.

Each device 120 includes input/output device interfaces 902. A variety of components may be connected through the input/output device interfaces 902. Through the network(s) 999, the system 600 may be distributed across a networked environment. The I/O device interface 902 may also include communication components that allow data to be exchanged between devices such as different physical servers in a collection of servers or other components. Additionally, each device 120 may include an address/data bus 924 for conveying data among components of the respective device. Each component within a device 120 may also be directly connected to other components in addition to (or instead of) being connected to other components across the bus 924.

As noted above, multiple devices may be employed in a single system. In such a multi-device system, each of the devices may include different components for performing different aspects of the system's processing. The multiple devices may include overlapping components. The components of the server(s) 120, as described herein, are exemplary, and may be located as a stand-alone device or may be included, in whole or in part, as a component of a larger device or system.

The components of system 600 discussed above may be operated as software, hardware, firmware, or some other combination of computing components.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   performing, by at least a first processor, at least a first training cycle for a first model to determine first gradient data, wherein the first processor is a first main processor;

determining, by the first processor and from the first gradient data, a portion of the first gradient data that satisfies a threshold;

performing, by at least a second processor, the at least first training cycle for a second model to determine second gradient data, the second processor being different than the first processor and the second gradient data being different than the first gradient data;

receiving, by the first processor and from the second processor, a portion of the second gradient data, wherein the portion of the second gradient data is determined from the second gradient data satisfying the threshold;

after receiving the portion of the second gradient data, performing, by the first processor and using the portion of the second gradient data and the portion of the first gradient data, at least a second training cycle for the first model to determine third gradient data;

after performing at least the second training cycle, coordinating an exchange of gradient data for performance of at least one training cycle by at least the first processor and a third processor by:

sending, by the first processor to at least the third processor, the third gradient data, the third processor being a second main processor and receiving, by the first processor and from at least the third processor, fourth gradient data determined by the third processor based on performing at least the first and second training cycles for a third model; and after receiving the fourth gradient data, performing, by the first processor and using the third gradient data and the fourth gradient data, at least a third training cycle for the first model.

2. The method of claim 1, further comprising:
determining the fourth gradient data by aggregating the third gradient data and fifth gradient data corresponding to data output by the third processor.

3. The method of claim 1, further comprising:
receiving, by the third processor, the third gradient data; and
performing, by the third processor and using the third gradient data, the at least third training cycle for the third model.

4. The method of claim 1, further comprising:
receiving, by the second processor, the portion of the first gradient data.

5. The method of claim 1, wherein receiving, by the first processor,
the fourth gradient data includes receiving the fourth gradient data being determined based on data output by at least the first processor, the second processor, and the third processor.

6. The method of claim 1, wherein the first processor and the second processor are included in a first network host, and the third processor is included in a second network host.

7. The method of claim 6, further comprising:
receiving, at the first network host, a first training dataset;
receiving, at the first processor, a first portion of the first training dataset;
receiving, at the second processor, a second portion of the first training dataset;
receiving, at the second network host, a second training dataset; and
receiving, at the third processor, a third portion of the second training dataset.

8. A system comprising:
at least a first processor configured to perform at least a first training cycle for a first model to determine first gradient data, wherein the first processor is a first main processor;
at least a second processor configured to perform the at least first training cycle for a second model to determine second gradient data, the second processor being different than the first processor and the second gradient data being different than the first gradient data;
the first processor is further configured to:
determine, from the first gradient data, a portion of the first gradient data that satisfies a threshold;
receive a portion of the second gradient data from the second processor, wherein the portion of the second gradient data is determined from the second gradient data satisfying the threshold;
after receiving the portion of the second gradient data, perform using the portion of the second gradient data and the portion of the first gradient data, at least a second training cycle for the first model to determine third gradient data;
after performing at least the second training cycle, coordinate an exchange of gradient data for performance of at least one training cycle by at least the first processor and a third processor by:
send, by the first processor to at least the third processor, the third gradient data, the third processor being a second main processor and
receive, by the first processor and from at least the third processor, fourth gradient data determined by the third processor based on performing at least the first and second training cycles for the first a third model; and
after receiving the fourth gradient data, perform, using the third gradient data and the fourth gradient data, at least a third training cycle for the first model.

9. The system of claim 8, wherein the fourth gradient data is determined by aggregating the third gradient data and fifth gradient data corresponding to data output by the third processor.

10. The system of claim 8, further comprising the third processor configured to:
receive the third gradient data; and
perform, using the third gradient data, the at least third training cycle for the third model.

11. The system of claim 8, wherein the second processor is further configured to:
receive the portion of the first gradient data.

12. The system of claim 8, wherein the first processor is configured to receive the fourth gradient data including the fourth gradient data being determined based on data output by at least the first processor, the second processor, and the third processor.

13. The system of claim 8, wherein the first processor and the second processor are included in a first network host, and the third processor is included in a second network host.

14. The system of claim 13, wherein:
the first network host is configured to receive a first training dataset;
the first processor is configured to receive a first portion of the first training dataset;
the second processor is configured to receive a second portion of the first training dataset;
the second network host is configured to receive a second training dataset; and
the third processor is configured to receive a third portion of the second training dataset.

15. The method of claim 1, wherein the first processor is the first main processor with respect to the second processor.

16. The system of claim 8, wherein the first processor is the first main processor with respect to the second processor.

17. The method of claim 1, wherein the first and second processors are included in a first system, and the third processor is included in a second system different than the first system.

18. The system of claim 8, wherein the first and second processors are included in a first system, and the third processor is included in a second system different than the first system.

* * * * *